(12) United States Patent
Lindskog

(10) Patent No.: US 11,480,157 B2
(45) Date of Patent: Oct. 25, 2022

(54) METHOD AND ARRANGEMENT RELATED TO HEATING OF WINGS IN WIND POWER PLANTS OR OTHER DEVICES

(71) Applicant: Kjell Lindskog, Skellefte (SE)

(72) Inventor: Kjell Lindskog, Skellefte (SE)

(*) Notice: Subject to any disclaimer, the term of this patent is extended or adjusted under 35 U.S.C. 154(b) by 394 days.

(21) Appl. No.: 16/483,202

(22) PCT Filed: Feb. 2, 2018

(86) PCT No.: PCT/SE2018/000003
§ 371 (c)(1),
(2) Date: Aug. 2, 2019

(87) PCT Pub. No.: WO2018/143860
PCT Pub. Date: Aug. 9, 2018

(65) Prior Publication Data
US 2020/0232445 A1    Jul. 23, 2020

(30) Foreign Application Priority Data
Feb. 6, 2017    (SE) .................................... 1700019-1

(51) Int. Cl.
| F03D 80/40 | (2016.01) |
| B29C 73/34 | (2006.01) |
| H05B 3/28 | (2006.01) |
| B29L 31/08 | (2006.01) |

(52) U.S. Cl.
CPC .............. *F03D 80/40* (2016.05); *B29C 73/34* (2013.01); *H05B 3/28* (2013.01); *B29L 2031/085* (2013.01)

(58) Field of Classification Search
CPC ....... F03D 80/40; F03D 1/0675; B29C 73/34; B29L 2031/085; H05B 3/28
See application file for complete search history.

(56) References Cited

U.S. PATENT DOCUMENTS

| 6,338,455 | B1 | 1/2002 | Rauch et al. | |
| 9,415,875 | B2* | 8/2016 | Stiesdal | B64D 15/12 |
| 9,482,208 | B2* | 11/2016 | Loewe | F03D 80/40 |
| 2007/0210073 | A1 | 9/2007 | Hubert et al. | |
| 2010/0308173 | A1 | 12/2010 | Atkinson | |
| 2013/0170992 | A1* | 7/2013 | Loewe | F03D 1/0675 |
| | | | | 416/95 |
| 2014/0014776 | A1 | 1/2014 | Calder et al. | |
| 2016/0282288 | A1 | 9/2016 | Desagtans et al. | |
| 2016/0338151 | A1 | 11/2016 | Lindskog | |

FOREIGN PATENT DOCUMENTS

| CA | 2936174 A1 * | 7/2015 | ........... B32B 37/025 |
| CN | 102822515 | 12/2012 | |
| EP | 2607075 | 6/2013 | |
| GB | 599617 | 3/1948 | |
| WO | WO 98/53200 | 11/1998 | |
| WO | WO 2008/013459 | 1/2008 | |
| WO | WO 2013/128682 | 9/2013 | |

* cited by examiner

*Primary Examiner* — Courtney D Heinle
*Assistant Examiner* — Sang K Kim
(74) *Attorney, Agent, or Firm* — Mark P. Stone

(57) ABSTRACT

The invention relates to a method for the application of heating mats (10) on a wing/blade of a wind power station or other devices for the purpose of achieving deicing also during operation when necessary. Temperature measurement and de-icing take place by means of pulsed current to the heating mat (10). The invention also relates to an arrangement.

8 Claims, 3 Drawing Sheets

METHOD AND ARRANGEMENT RELATED TO HEATING OF WINGS IN WIND POWER PLANTS OR OTHER DEVICES

TECHNICAL FIELD

The present invention relates to a method for heating of wings/blades or other devices according to the introduction in patent claim 1. The invention also pertains to a device.

BACKGROUND OF THE INVENTION

It is a problem to identify and/or prevent, when needed, the icing over of wings or rotor blades of wind power stations or wind turbines subject to a weather environment where there is a risk for icing.

Purpose of the Invention

One purpose of the present invention is to achieve a method for ice detection, warming and de-icing of wings/rotor blades on wind power stations and similar devices. Another purpose of the present invention is to achieve an attractive device that facilitates the procedure according to the invention. These objectives are achieved through the characteristics defined in the patient claims.

Here it must be pointed out that the present invention is based on certain basic principles described in WO 2015/105439 A1, to which reference is made. According to the present invention a method and a device are achieved that facilitate a well-functioning application on, for example, rotor wings/blades of wind power stations or wind turbines.

Advantages of the Invention

The invention allows an extremely advantageous alternative for the prevention of ice formation on wings according to the above and without the need for operational downtime because of ice formation. This results in substantial economic benefits. The device according to the invention can easily be applied to both wings already in service and newly manufactured wings. Preventative wing warming so that ice formation cannot even begin is also made possible by the invention. Ice detection is also made possible according to the invention. The invention presents many technical and economic benefits.

BRIEF DESCRIPTION OF THE DRAWINGS

Embodiments of the invention shall be described in greater detail in the following with respect to the attached drawings, on which

DETAILED DESCRIPTION OF EMBODIMENT SHOWN

Figure 1:
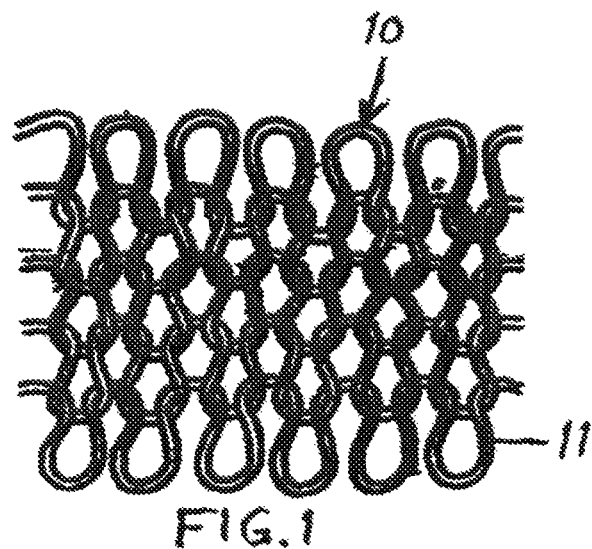
FIG. 1 shows a schematic representation of a section of a heating mat in one embodiment.

FIG. 1 shows a section of a heating mat 10 according to the invention, which is comprised of an electrically conductive wire 11 featuring an electrically insulated outer layer so that adjacent cross-wiring is possible without risk of short-circuiting.

The heating mat 10 is produced through a knitting operation such as illustrated in FIG. 1. It shall be understood that the shape, size, knit pattern and mesh size of the mat can naturally vary according to need and preference. One can use, for example, enameled copper wire 11. The desired performance of the heating mat naturally affects the choice of wire diameter and mesh size. The mat depicted, which is single-wire, creates one electrical circuit. If the heating mat is knitted from double wire, two electrical circuits, or alternatively a back-up circuit, can be created. The mesh size can also vary within any given heating mat based on need.

The heating mat 10 can also be produced in an alternative embodiment through a crocheting operation using an electrically conductive wire 11 that features an electrically insulated outer layer so that adjacent cross-wiring is possible without a risk of short-circuiting.

It shall be understood that the size, shape and crochet pattern of the mat 10 can naturally vary according to needs and preference. The same conditions as in the above described knit variation are applicable with respect to wire selection, mesh size, etc. If the heating mat 10 is made with double wire, then two circuits, or alternatively a back-up circuit, are possible. Here, too, mesh size may vary within any given heating mat according to need.

Stripshaped and insulated electrically conductive wire can also be used in the knitting and crocheting under the abovementioned conditions.

Figure 2:
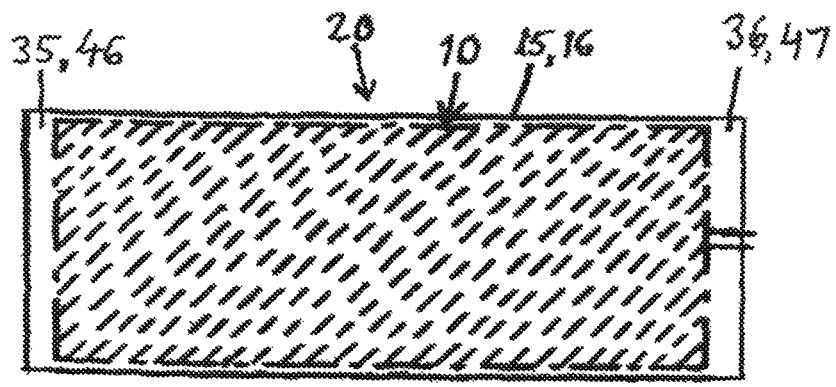
FIG. 2 shows a schematic representation of an overhead view of a flexible mat unit according to the invention, where the two carrier layers are situated on either side of the heating mat.

FIG. 2 shows a schematic depiction of a heating mat 10 constructed according to one of the above alternatives, arranged between two carrier layers 15, 16 of an incompletely cured thermoset plastic, which may be reinforced with suitable reinforcement material. The thermoset plastic may be comprised of, for example, polyester, epoxy plastic or polyurethane, and any reinforcement may be of glass fiber or other suitable fibers. Glass-fiber reinforced epoxy plastic has been found to be particularly appropriate.

The incompletely cured carrier layers 15, 16 achieve an adhesion of the heating mat 10 so that they form a cohesive unit with formability/flexibility such that it can be stored rolled or folded. It is thereby advantageous to temporarily affix one or more temporary protective foils (not shown) to the side/sides of the carrier layer facing away from the heating mat to prevent sticking between carrier layers, such as during transport and subsequent handling.

The mat unit 20 shown in FIG. 2 has been made into a cohesive unit through a certain degree of warming under simultaneous compression.

In the mat unit 20 shown in FIG. 2, the carrier layers 15, 16 show an overage in relation to the heating mat 10 at two opposing ends so as to form overhangs. The overhangs of carrier layer 15 are designated 35, 36 and the overhangs of carrier layer 16 are designated 46, 47.

Figure 3:
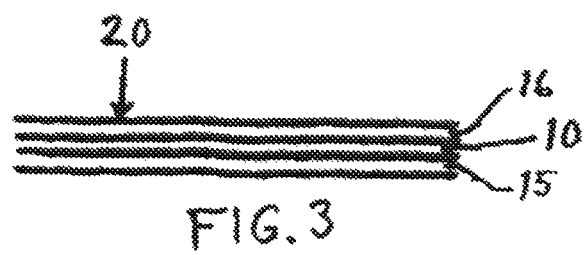
FIG. 3 shows a schematic cross-section of a mat unit including two carrier layers.

FIG. 3 shows a partial cross-section through the mat unit 20 and here it should be mentioned that if necessary, extra epoxy films (not shown) can also be included in the mat unit 20 to achieve a good surface finish and good adhesion to the given wing. An epoxy film (not shown) can also be arranged between the heating mat 10 and one or both carrier layers. Any peel-off films (not shown) are removed prior to installation.

Figure 4:
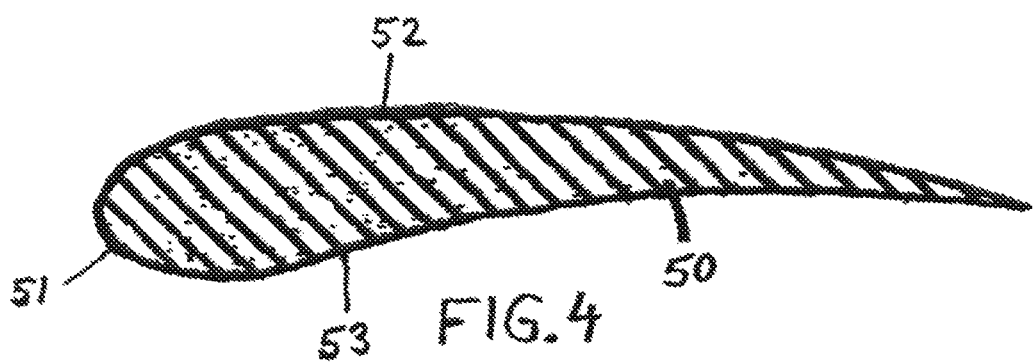
FIG. 4 shows a schematic cross-section of a rotor wing before application of the device according to the invention.

FIG. 4 shows a cross-section of a rotor wing/blade 50, here, however, it shall be understood that the shape of a rotor wing may naturally vary, as may the cross-section size along a rotor wing. The rotor wing 50 shows a so-called stagnation point 51, the approximate placement of which is indicated in the figure. On either side of the stagnation point the wing 50 features a pressure side 52 and a suction side 53.

Figure 5:
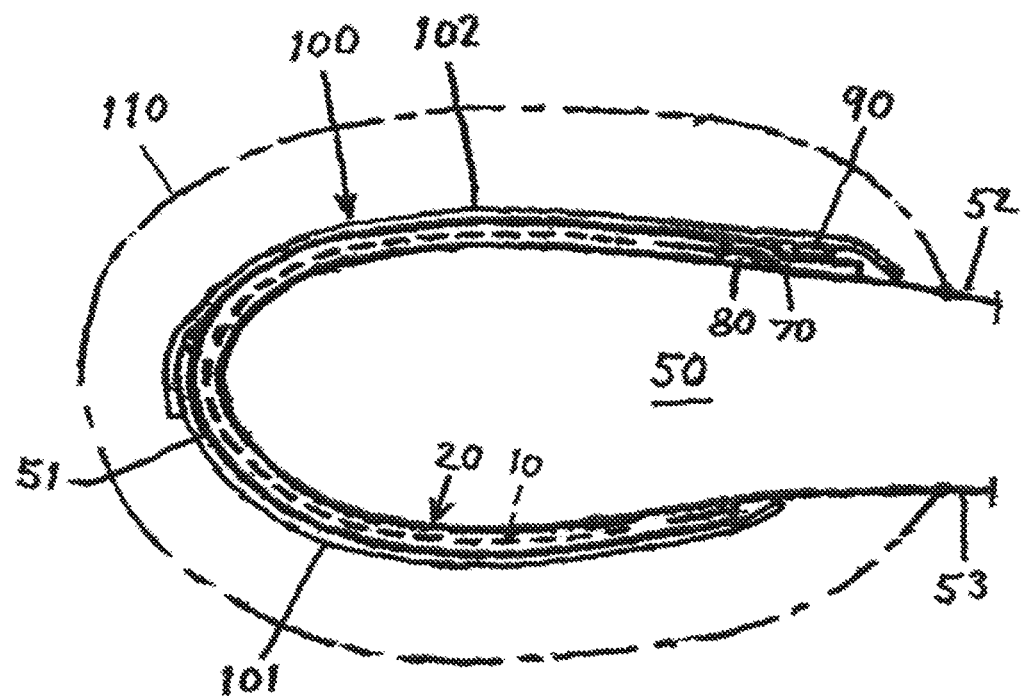
FIG. 5 shows a schematic representation of the installation of the device according to the invention on the wing according to FIG. 4.

FIG. 5 shows an installation procedure according to the invention through placement of a mat unit 20 according to the invention on a rotor wing 50.

A mat unit 20 is first positioned on the front edge of the wing 50, whereupon the protective foils are first removed. The mat unit 20 will thereby adhere to the surface of the wing. The connecting wires of the heating mat 10 are then connected to the wires appropriate for this purpose in a cable group 80, which is arranged along the rotor wing 50. A cover mat 70, which may be made from glass fiber reinforced epoxy plastic, for example, such as shown in FIG. 5, is then applied, and on top of the cover mat a lightning conductor 90 is arranged.

A flexible heating plate 100 divided into two sections 101, 102, which may be made, for example, from spring steel or a similarly flexible material with a thickness of approx. 0.5 mm, is then arranged. The plate sections 101, 102 contribute to proper levelling and a good surface finish of the mat unit 20 and nearby components, which helps contribute to a turbulence free transition to the wing 50 after completed curing and removal of the plate sections 101, 102. It shall be understood that the plate 100 in certain cases can also be made in a single piece or have additional divisions beyond what is shown here.

On the outsides of the plate sections 101, 102, a number of electrical heat sources (not shown) are arranged, making it possible for the curing heat to be regulated as needed in the different areas. The heating mat 10 can also be involved in the curing process to ensure adequate curing, and sometimes may serve as the only heat source. The heating mat 10 can also be used for measuring temperature during curing.

In the example shown the thermoset plastic parts 101, 102 are arranged with a certain overlap such as shown in FIG. 5.

It is also advantageous to arrange a tensioning device 110 such as in the form of a so-called vacuum bag sealed against the wing 50 and to vacuum-set the arrangement prior to the curing process in order to maximize contact between the sections of the heating plate and the underlying components. It shall be understood that alternative tensioning devices are possible within the framework of the invention.

The abovementioned curing possibilities thus allow for adequate and desirable curing results.

Once the curing process is complete, the vacuum bag 110 and the forming plate/curing plate 100 are removed, after which the results achieved are inspected and any necessary follow-up measures can be taken.

It is also possible to carry out simultaneous installation and curing of two or more mat units 20 that are closely-spaced or bordering one another, whereby size adjustments of the forming- and curing plate 100 and the vacuum bag 110 must be made.

According to another embodiment, the heating mat 10 can be divided into two different heating mats and mat units 20, whereby the dividing line between the two mat units runs preferably along the stagnation line 51 as defined by the stagnation point of the wing 50. It is thereby possible to design the two heating mats 10 with a small mesh size in their end area along the stagnation line to enable increased warmth.

This has, among other things, the advantage that the two heating mats can be more easily adapted to needs of the various ice formation conditions normally prevailing on the pressure side 52 and suction side 53 of the wing 50. Application and installation take place according to the principle described above and wiring is completed as necessary for the mat units to be individually controlled.

When using two separate mat units instead of one mat unit, these are connected along the stagnation line, such as by means of epoxy plastic. It shall be understood that further divisions of the heating mats and mat units are, of course, possible within the framework of the invention.

Figure 6:
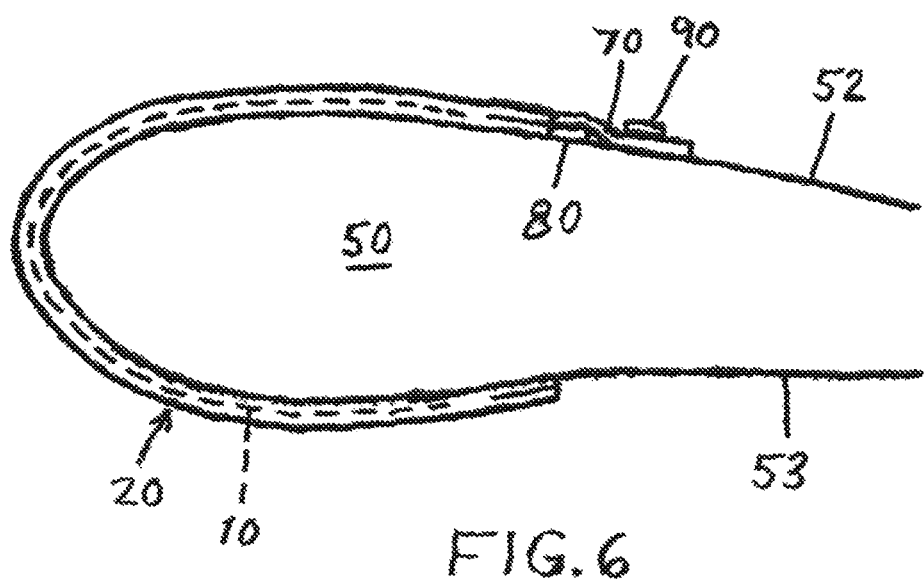
FIG. 6 shows a schematic representation of the wing after completed installation.

FIG. 6 shows a rotor wing 50 fitted with the device according to the invention. The sections most prone to ice formation along the rotor wings in question 50 are according to the invention fitted with devices according to the invention.

The heating mat's connecting wires are successively connected to the appropriate line in the cable group 80 during installation of the mat units 20 and preferably in such a way that the heating mats are connected in parallel to facilitate individual control. Serial connection is possible in certain cases.

The lightning conductors 90 which are anchored in the cover mat 70 are successively joined lengthwise when installing the mat units and connected to the existing lighting protection system.

By varying the mesh size in the knitted or crocheted heating mats 10 it is possible to adapt the thermal output according to prevailing needs. Mesh size may vary within any given heating mat and be small in the section of the heating mat that will be in contact with the front part of the wing and stagnation point and larger in other parts of the heating mat. It shall be understood that several different mesh sizes can therefore occur within any given heating mat. Here it should also be mentioned that most ice formation usually occurs in the stagnation point.

From the above It shall be understood that the shape, size and detailed design of the mat unit 20 can be adapted to prevailing needs, whereby it can, for example include more than one heating mat 10. Stacked heating mats are also possible with the addition of intermediate epoxy films, for example.

With respect to de-icing, it is usually the most advantageous to heat attack in the area of the stagnation point/stagnation line, which is made possible by the present invention.

The possibilities afforded by the invention, such as continuous temperature monitoring through individual resistance measurement in the heating mats, allow for significant energy savings in that it is possible to initiate blade warming in the correct stage and extent.

In the event of a failure in a given heating mat on a rotor wing the corresponding heating mat on other rotor wings can be temporarily disabled in order to minimize imbalance.

A central computer is also arranged, which is configured for collection of, among other things, measurement data from each heating mat and for individual control of current flow or pulsed current to the heating mats. Wireless communication with two-way communications devices in the rotor wings is thereby established.

The central computer thus monitors any ice formation on the rotor wings and directs the current pattern to the various heating mats. Any damages are also indicated. The central computer can in turn communicate remotely with a control room, for example.

The invention therefore allows different levels of heating along a wing so as to enable absence of ice along the entire wing, which is a major advantage since cooling increases going towards the tip of the wing.

It should be noted that curing usually takes place under use of pulsed current so that the intended curing temperature can be controlled to obtain adequate curing results. The curing process is monitored through pulsed current to the heating mats and resistance measurement.

During use of the device according to the invention the pulsed currents will provide information on the wings's temperature during both monitoring and heating. A precipitation indicator can sometimes serve as an energy-saving add-on.

In an alternative embodiment, a second lightning conductor can also be arranged on the side of the wing 50 opposite the lighting protection 90, which results in even better protection in the event of a lightning strike. In this case, it is advantageous to complete the application of the second lighting protector in the same way as lighting protector 90 in an equivalent cover mat 70, whereby the cable group 80 can be divided into two cable groups, which among other things is advantageous in heating mats divided along the stagnation line. The lightning conductors and cable groups are joined afterwards as additional mat units 20 are arranged on the wing in question. The lightning conductors are anchored in the metal tip of the wing and connected to the rest of the lightning protection system in the wind power plant.

The design of the heating plate or plates must naturally be adapted to the abovementioned conditions.

If a thermoset plastic film is applied, such as an epoxy film, on the side of the mat unit 20 facing away from the wing, the need for heating plates can be reduced to the areas where the cable groups and lightning conductors are located. Other parts of the mat unit 20 can thereby be cured using the heating mat 10. The thermoset plastic film provides a good surface finish.

According to the invention a large number of heating mat units (sections) 20 are arranged along the length of the wing 50. Each heating mat unit 20 offers the possibility for individual temperature measurement and individual heating during operation and also during downtime. Since heating can be adjusted to need along the length of the wing, substantial energy savings can be realized. This also allows for compensation of imbalance between different wings. Individual temperature measurement in each mat section/mat unit 20 therefore results in low power consumption and better de-icing.

It is also possible to adjust the size of the given heating mat units 20 so as to facilitate any future repairs.

A major advantage of producing the heating mat 10 through a knitting or crocheting process is that the impact of temperature changes in the wire will not have any effect on the mat's outer dimensions.

It is also possible to use more than two parallel wires, such as 5 wires, to adapt the heating performance of the mats to various operating conditions.

The invention is therefore not limited to what has been illustrated and described; changes and modifications to the invention are naturally conceivable within the scope of the following patent claims.

The invention claimed is:

1. Method for application of a number of heating mats on a wind power station wing/blade for a purpose of achieving de-icing also during operation, where needed, wherein the steps of said method are characterized in that at least one said heating mat (10) is first applied in an intended place on the wing (50) and that electrical connections are supplied, that at least one heating plate (100) is then applied on the heating mat (10) or in the proximity of the heating mat and a tensioning device (110) is arranged which surrounds the heating mat with surrounding parts, after which curing takes place after the tensioning device is activated, wherein the curing heat is generated by the heating plate (100) and via the heating mat (10), and wherein control of curing progress takes place through pulsed current to the heating mat (10).

2. Method according to claim 1, characterized in that the heating mats (10) installed are used for temperature monitoring in the wing (50) and for de-icing the wing, whereby pulsed currents are used.

3. Method according to claim 1, characterized in that a heating mat unit (20) is formed from a plurality of heating mats (10).

4. Method according to claim 1, characterized in that the heating mats (10) are produced through knitting or crocheting of enameled metal wire, including copper wire, whereby the heating mats (10) are formed with mesh openings, wherein the size of said mesh openings are variable.

5. Method according to claim 4, characterized in that the size of the mesh opening of the heating mats (10) is smaller at a stagnation point/stagnation line (51) of the wing (50) than at other positions on the heating mats (10).

6. Method according to claim 3, characterized in that the mat unit (28) includes two carrier layers (15, 16) that are arranged on different sides of the heating mat (10).

7. Method according to claim 3, characterized in that the mat unit (20) includes at least one cover mat (70) for at least one cable group (80).

8. Method according to claim 7, characterized in that at least one lighting conductor (90) is arranged on the outside of the cover mat (70) or cover mats.

* * * * *